United States Patent
Wang

(10) Patent No.: US 12,067,323 B2
(45) Date of Patent: Aug. 20, 2024

(54) DATA PROCESSING METHOD AND DEVICE AND STORAGE MEDIUM

(71) Applicant: Lenovo (Beijing) Limited, Beijing (CN)

(72) Inventor: Ke Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 162 days.

(21) Appl. No.: 17/684,171

(22) Filed: Mar. 1, 2022

(65) Prior Publication Data

US 2023/0094641 A1 Mar. 30, 2023

(30) Foreign Application Priority Data

Sep. 30, 2021 (CN) .......................... 202111162050.6

(51) Int. Cl.
*G06F 3/14* (2006.01)
*G06F 1/16* (2006.01)

(52) U.S. Cl.
CPC .......... *G06F 3/1446* (2013.01); *G06F 1/1647* (2013.01)

(58) Field of Classification Search
CPC .............................. G06F 3/1446; G06F 1/1647
USPC ...................................................... 345/660
See application file for complete search history.

(56) References Cited

U.S. PATENT DOCUMENTS

| | | | | |
|---|---|---|---|---|
| 2008/0030425 A1* | 2/2008 | Fullerton | ............ | G06F 3/04845 345/1.1 |
| 2008/0214239 A1* | 9/2008 | Hashimoto | ........... | G06F 3/1454 455/557 |
| 2008/0247128 A1* | 10/2008 | Khoo | .................... | G06F 1/1641 361/679.04 |
| 2012/0050314 A1* | 3/2012 | Wang | .................... | G06F 3/1446 345/619 |
| 2016/0292820 A1* | 10/2016 | Kuan | .................... | G06F 3/1446 |
| 2018/0203660 A1* | 7/2018 | Hwang | ................. | G06F 3/1423 |
| 2022/0019397 A1* | 1/2022 | Park | ..................... | H04N 21/431 |

* cited by examiner

*Primary Examiner* — Jin Ge
(74) *Attorney, Agent, or Firm* — ANOVA LAW GROUP, PLLC

(57) ABSTRACT

A data processing method applied to a first electronic device. The method includes determining first data and second data corresponding to a first display unit and a second display unit respectively based on an obtained to-be-displayed data; adjusting the first data and the second data to obtain target first data and target second data respectively based on an adjustment parameter, the adjustment parameter being determined based on display parameters of the first display unit and the second display unit, the display parameters being related to pixels per unit area of the first display unit and the second display unit; and outputting the target first data to the first display unit and outputting the target second data to the second display unit for the first display unit and the second display unit to display the same size when displaying the same object.

17 Claims, 8 Drawing Sheets

DATA PROCESSING METHOD AND DEVICE AND STORAGE MEDIUM

CROSS-REFERENCES TO RELATED APPLICATION

This application claims priority to Chinese Patent Application No. 202111162050.6 filed on Sep. 30, 2021, the entire content of which is incorporated herein by reference.

FIELD OF TECHNOLOGY

The present disclosure relates to the field of computer processing technology and, more specifically, to a data processing method and device, and a storage medium.

BACKGROUND

In the dual-screen electronic devices, when display screens of different physical sizes, different resolutions and/or different pixel densities display interrelated contextual content, cross-screen breakage can occur.

BRIEF SUMMARY OF THE DISCLOSURE

One aspect of the present disclosure provides a data processing method applied to a first electronic device. The method includes determining first data and second data corresponding to a first display unit and a second display unit respectively based on an obtained to-be-displayed data; adjusting the first data and the second data to obtain target first data and target second data respectively based on an adjustment parameter, the adjustment parameter being determined based on display parameters of the first display unit and the second display unit, the display parameters being related to pixels per unit area of the first display unit and the second display unit; and outputting the target first data to the first display unit and outputting the target second data to the second display unit for the first display unit and the second display unit to display the same size when displaying the same object.

Another aspect of the present disclosure provides a first electronic device. The first electronic device includes a first display unit configured to display a target first data; a second display unit configured to display a target second data; and a processor. The processor is configured to determine first data and second data corresponding to the first display unit and the second display unit respectively based on an obtained to-be-displayed data; adjust the first data and the second data based on an adjustment parameter to obtain the target first data and the target second data respectively, the adjustment parameter being determined based on display parameters of the first display unit and the second display unit, the display parameters being related to pixels per unit area of the first display unit and the second display unit; and output the target first data to the first display unit and output the target second data to the second display unit for the first display unit and the second display unit to display the same size when displaying the same object.

Another aspect of the present disclosure provides a non-transitory computer-readable storage medium containing computer-executable instructions for, when executed by one or more processors, performing a data processing method applied to a first electronic device. The method includes determining first data and second data corresponding to a first display unit and a second display unit respectively based on an obtained to-be-displayed data; adjusting the first data and the second data to obtain target first data and target second data respectively based on an adjustment parameter, the adjustment parameter being determined based on display parameters of the first display unit and the second display unit, the display parameters being related to pixels per unit area of the first display unit and the second display unit; and outputting the target first data to the first display unit and outputting the target second data to the second display unit for the first display unit and the second display unit to display the same size when displaying the same object.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

For the convenience of understanding the technical solutions of the embodiments of the present disclosure, the related technologies of the embodiments of the present disclosure will be described below.

For long-image browsing scenarios such as browsing, shopping, news, documents, etc., when there is multi-screen interaction with display screens of different sizes and different resolutions, a breakage can occur in the cross-screen software interface. That is, the displayed content on multiple display screens cannot be aligned.

Technical solutions of the present disclosure will be described in detail with reference to the drawings. It will be appreciated that the described embodiments represent some, rather than all, of the embodiments of the present disclosure.

Other embodiments conceived or derived by those having ordinary skills in the art based on the described embodiments without inventive efforts should fall within the scope of the present disclosure.

Figure 1:
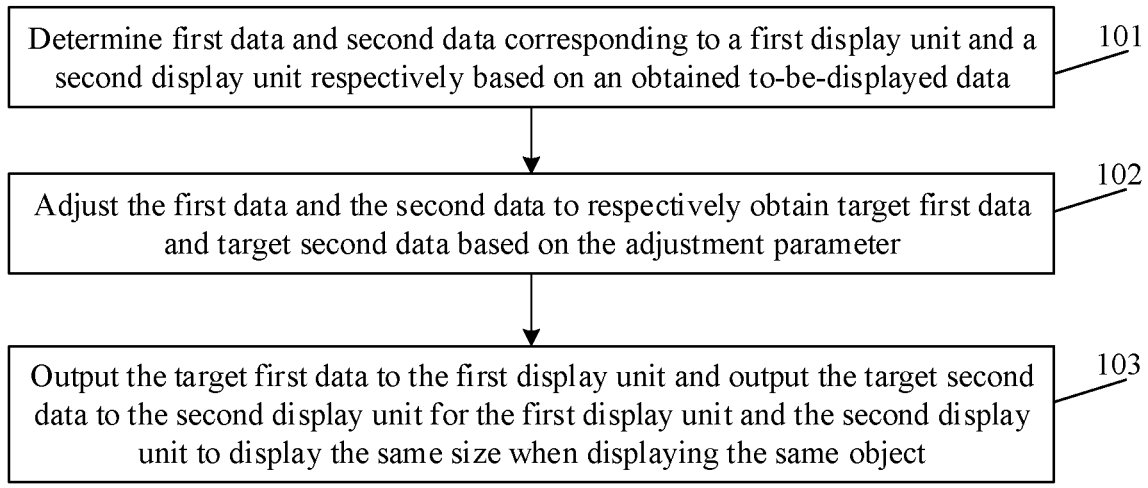
FIG. 1 is a flowchart of a data processing method according to an embodiment of the present disclosure.

FIG. 1 is a flowchart of a data processing method according to an embodiment of the present disclosure. The method can be applied to a first electronic device. The method will be described in detail below.

101, determining first data and second data corresponding to a first display unit and a second display unit respectively based on an obtained to-be-displayed data.

In some embodiments, the to-be-displayed data may be background data to be displayed on the first display unit and the second display unit. The to-be-displayed data may be understood as background rendering data that needs to be rendered into the page.

In some embodiments, the first display unit may correspond to the first data, and the second display unit may correspond to the second data. It should be understood that the first data is the data to be displayed by the first display unit, and the second data is the data to be displayed by the second display unit. That is, determining first data and second data corresponding to a first display unit and a second display unit respectively based on an obtained to-be-displayed data may be the process of splitting the to-be-displayed data to obtain the first data corresponding to the first display unit and the second data corresponding to the second display unit.

102, adjusting the first data and the second data to respectively obtain target first data and target second data based on the adjustment parameter.

In some embodiments, the adjustment parameter may be determined based on the display parameters of the first display unit and the second display unit, and the display parameters may be related to the pixels per unit area of the first display unit and the second display unit.

In some embodiments, the adjustment parameters of the first data and the second data may be consistent. That is, the same adjustment parameter may be used to adjust the first data and the second data, thereby obtaining the target first data and the target second data respectively.

In some embodiments, the target first data may correspond to the first data, and the target second data may correspond to the second data. That is, the first data may be adjusted based on the adjustment parameter to obtain the target first data, and the second data may be adjusted based on the adjustment parameter to obtain the target second data.

103, outputting the target first data to the first display unit and outputting the target second data to the second display unit such that when the first display unit and the second display unit display the same object, the display size is the same.

In some embodiments, the target first data may be displayed on the first display unit and the target second data may be displayed on the second display unit, thereby realizing the display of the processed to-be-displayed data (target first data and target second data) on the first display unit and the second display unit in sequence. In this way, the processed to-be-displayed data can be displayed in two display units (the first display unit and the second display unit), but the display effect is consistent with one display unit. For example, when displaying a document, the first display unit may display the first three paragraphs of the document, then the second display unit may display the content following the last line of the first display unit.

Consistent with the present disclosure, first, based on the obtained to-be-displayed data, the first data and the second data corresponding to the first display unit and the second display unit can be respectively determined. Then, based on the adjustment parameter, the first data and the second data can be adjusted to obtain the target first data and the target second data respectively, where the adjustment parameter may be determined based on the display parameters of the first display unit and the second display unit, and the display parameters may be related to the pixels per unit area of the first display unit and the second display unit. Subsequently, the target first data can be output to the first display unit and the target second data can be output to the second display unit such that when the first display unit and the second display unit display the same object, the display size can be the same. By adjusting the first data and the second data using the same adjustment parameter, the target first data and the target second data of the same display size can be obtained. In this way, the display contents of the first display unit and the second display unit can be aligned.

In some embodiments, the first display unit and the second display unit may both belong to a first electronic device; or, the first display unit may belong to the first electronic device, and the second display unit may belong to a second electronic device. That is, the first display unit and the second display unit may be display screens of a dual-screen electronic device, or may be display screens on a single-screen electronic device that can be connected to each other, which is not limited in the embodiments of the present disclosure.

Figure 2:
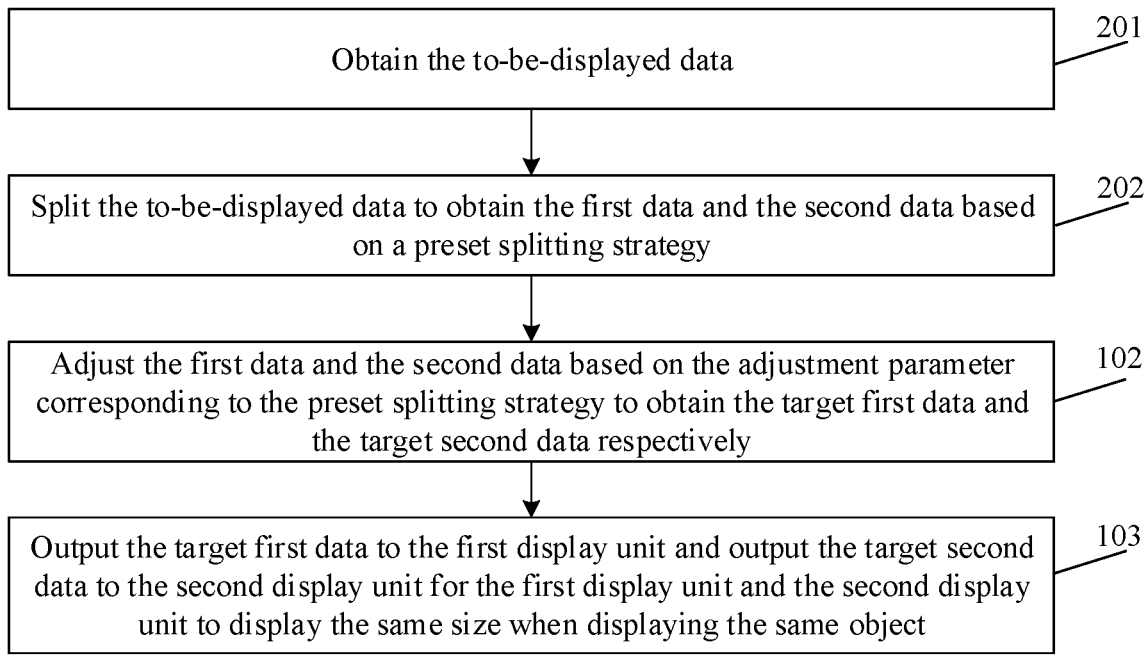
FIG. 2 is a flowchart of the data processing method according to an embodiment of the present disclosure.

In some embodiments, when both the first display unit and the second display unit belong to the first electronic device, a splitting strategy may be directly written based on the display parameters of the first display unit and the second display unit before leaving the factory. FIG. 2 is a flowchart of the data processing method according to an embodiment of the present disclosure. The method will be described in detail below.

201, obtaining the to-be-displayed data.

In some embodiments, the to-be-displayed data may be the rendering data submitted by an application to a virtual desktop, and obtaining the to-be-displayed data may be understood as the virtual desktop receiving the rendering data submitted by the application. In some embodiments, the virtual desktop may be a virtual display screen working on the operating system, and the application may be an application working in the cross-screen interactive mode.

202, splitting the to-be-displayed data to obtain the first data and the second data based on a preset splitting strategy.

In some embodiments, when both the first display unit and the second display unit belong to the first electronic device, the display parameters of the first display unit and the second display unit can be determined before the electronic device leaves the factory. Therefore, in the actual application scenario after leaving the factory, after the to-be-displayed data is obtained, the to-be-displayed data may be directly split based on the preset splitting strategy to obtain the first data and the second data that can meet the requirements.

In the embodiments of the present disclosure, when both the first display unit and the second display unit belong to the first electronic device, the to-be-displayed data can be split based on the preset splitting strategy, such that the first data and the second data that meet the requirements can be obtained directly and efficiently.

In some embodiments, the first electronic device may include an upper cover and a lower cover. The first display unit may be a display screen of the upper cover, and the second display unit may be a display screen of the lower cover. The process at 102 may further include the following process.

121, adjusting the first data and the second data based on the adjustment parameter corresponding to the preset splitting strategy to obtain the target first data and the target second data respectively.

In some embodiments, the target first data and the target second data may be displayed on the display screen of the upper cover and the display screen of the lower cover, such that the target first data and the target second data can be linked and changed. The following description takes the first display unit and the second display unit as touch screens as an example for description. When a sliding operation is performed on the first display unit or the second display unit, the display contents of the first display unit and the second display unit may be changed at the same time, thereby forming a single-screen waterfall display effect. That is, the first display unit and the second display unit can not only increase the display area of the displayed content, but can also achieve the display effect of one display unit on tow display units.

In some embodiments, the preset splitting strategy may correspond to the adjustment parameter, and the first data and the second data may be adjusted based on the adjustment parameter corresponding to the preset splitting strategy. That is, the first data and the second data may be adjusted based on the same adjustment parameter. In this way, whether the obtained target first data is displayed on the first display unit or the second display unit, the display effect is consistent. Similarly, whether the obtained target second data is displayed on the first display unit or the second display unit, the display effect is consistent. In some embodiments, the target first data and the target second data may be content-related to-be-displayed data.

In some embodiments, based on the adjustment parameter corresponding to the preset splitting strategy, the first data may be adjusted to obtain the target first data. Further, based on the adjustment parameter corresponding to the preset splitting strategy, the second data may be adjusted to obtain the target second data.

Figure 3:
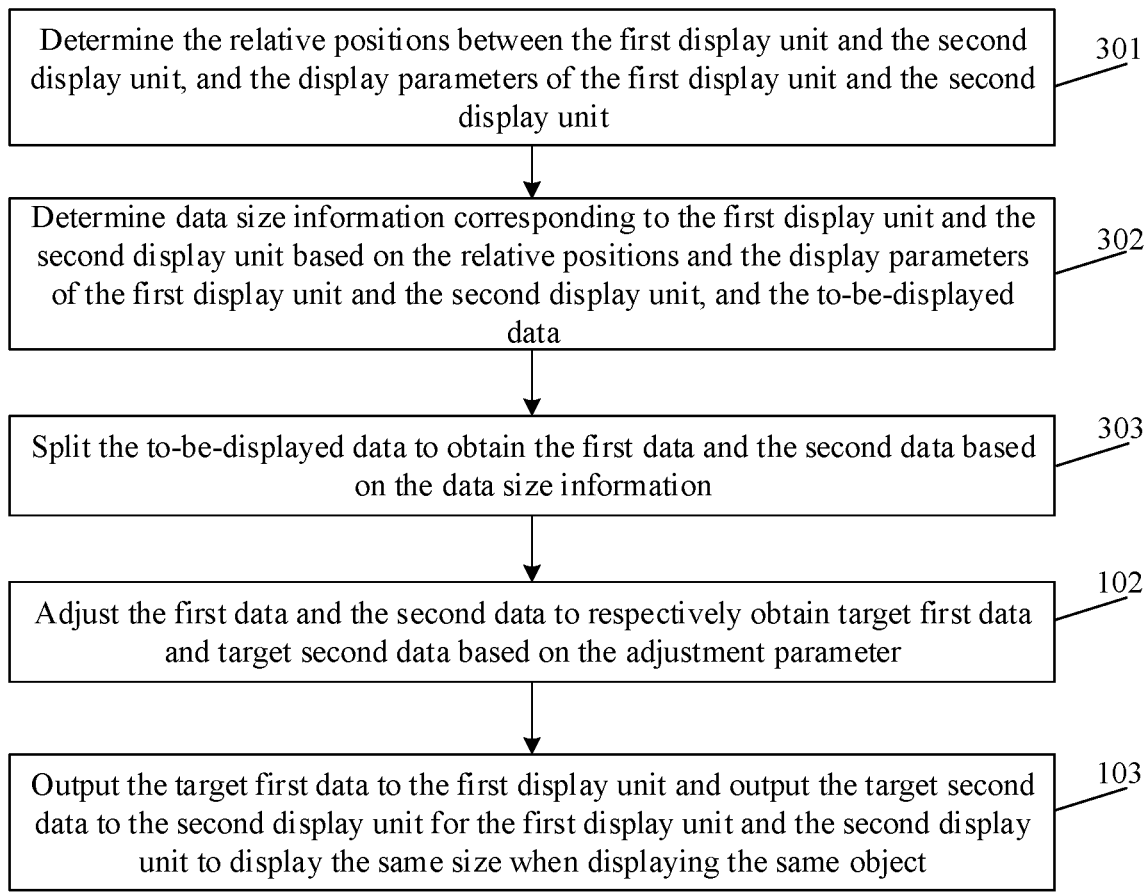
FIG. 3 is a flowchart of the data processing method according to an embodiment of the present disclosure.

In some embodiments, the to-be-displayed data may also be split based on the relative position and display parameters of the first display unit and the second display unit. FIG. 3 is a flowchart of the data processing method according to an embodiment of the present disclosure. As shown in FIG. 3, the process at 101 may include the following processes.

301, determining the relative positions between the first display unit and the second display unit, and the display parameters of the first display unit and the second display unit.

In some embodiments, the relative positions of the first display unit and the second display unit may be determined. For example, the first display unit may be the upper screen of the dual-screen laptop, and the second display unit may be the lower screen of the dual-screen laptop. As such, the first display unit may be on the upper side relative to the second display unit, and the second display unit may be on the lower side relative to the first display unit. In another example, the first display unit may be the display screen of a mobile phone, the second display unit may be an expansion screen of a computer, and the first display unit and the second display unit may be arranged horizontally in sequence. As such, the first display unit may be on the left or right side relative to the second display unit, and the second display unit may be on the left or right side relative to the first display unit. It should be understood that determining the relative position between the first display unit and the second display unit may be to determine the display order of the to-be-displayed data. For example, if the first display unit is on the upper side of the second display unit, the previous to-be-displayed data may be displayed on the first display unit, and the next to-be-displayed data may b displayed on the second display unit. In this way, the user's long-image browsing experience can be improved.

In some embodiments, determining the display parameters of the first display unit and the second display unit may be to split the to-be-displayed data proportionally based on the display parameters of the first display unit and the second display unit. For example, if the vertical dimensions of the first display unit and the second display unit are the same, then the amount of data of the to-be-displayed data allocated to the first display unit and the second display unit may be the same. In another example, if the vertical dimension of the first display unit is twice the vertical dimension of the second display unit, then the amount of data of the to-be-displayed data allocated to the first display unit may be twice the amount of data of the second display unit. In addition, since the first data and the second data are adjusted based on the same adjustment parameter, the horizontal physical dimensions of the first display unit and the second display unit may be arbitrary.

302, determining data size information corresponding to the first display unit and the second display unit based on the relative positions and the display parameters of the first display unit and the second display unit, and the to-be-displayed data.

In some embodiments, since the associated data needs to be displayed on the first display unit and the second display unit, not only the relative positions of the first display unit and the second display unit need to be determined, but the display parameters of the first display unit and the second display unit may also need to be determined. In this way, the corresponding to-be-displayed data can be determined on the display unit whose position and display parameters are determined.

In some embodiments, the data size information corresponding to the first display unit and the second display unit may be determined from the to-be-displayed data based on the relative positions and the display parameters of the first display unit and the second display unit. Generally, the display order of the to-be-displayed data may be determined based on the relative positions of the first display unit and the second display unit, and the amount of data of the to-be-displayed data on the first display unit and the second display unit may be determined based on the display parameters of the first display unit and the second display unit.

303, splitting the to-be-displayed data to obtain the first data and the second data based on the data size information.

In some embodiments, since the size information can be determined based on the relative positions and the display parameters of the first display unit and the second display unit, therefore, by dividing the to-be-displayed data based on the size information corresponding to each display unit, the first data of the to-be-displayed data of the first display unit and the second data of the to-be-displayed data of the second display unit may be obtained.

Consistent with the present disclosure, first, the relative positions of the first display unit and the second display unit, and the display parameters of the first display unit and the second display unit can be determined. Then, the data size information corresponding to the first display unit and the second display unit can be determined based on the relative positions and the display parameters of the first display unit and the second display unit, and the to-be-displayed data. Subsequently, the to-be-displayed data can be split to obtain the first data and the second data based on the data size information. In this way, the corresponding to-be-displayed data can be determined on the display unit whose position and display parameters are determined.

Figure 4:
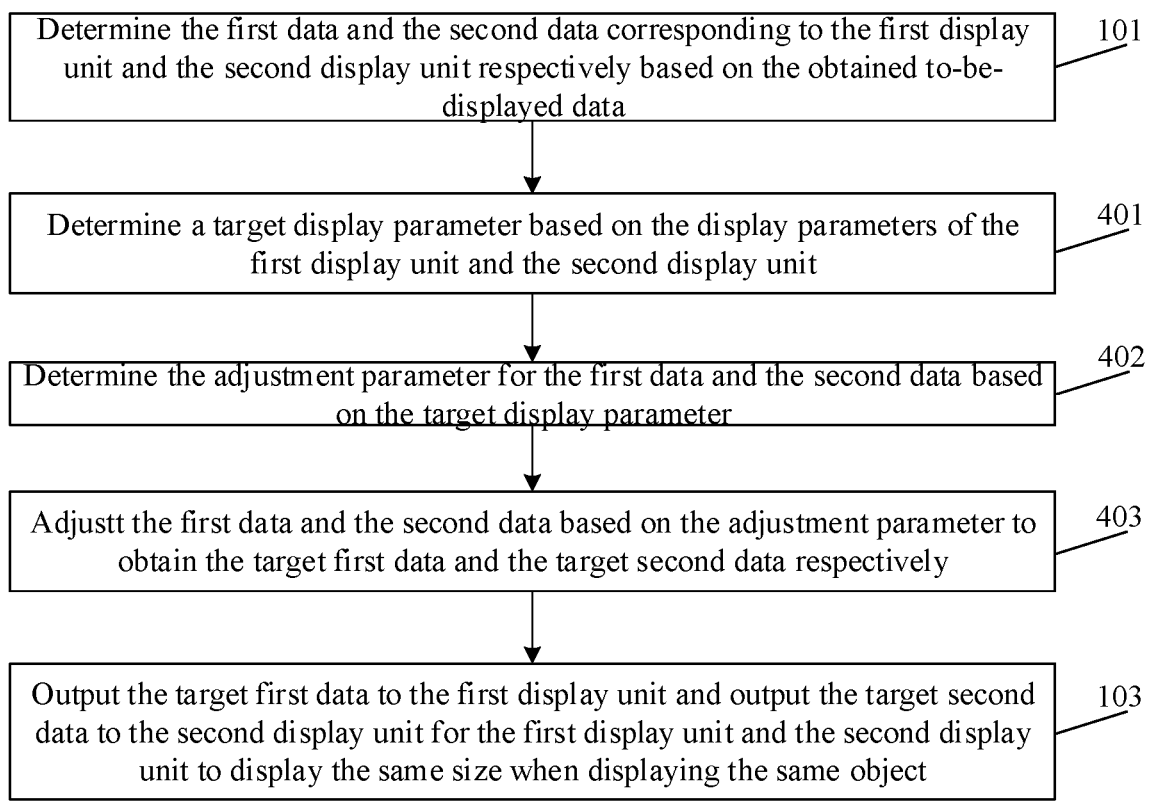
FIG. 4 is a flowchart of the data processing method according to an embodiment of the present disclosure.

In some embodiments, a target display parameter may be determined based on the display parameters of the first display unit and the second display unit, and the first data and the second data may be adjusted by using the target display parameter. FIG. 4 is a flowchart of the data processing method according to an embodiment of the present disclosure. As shown in FIG. 4, the process at 102 may include the following processes.

401, determining a target display parameter based on the display parameters of the first display unit and the second display unit.

In some embodiments, the display parameter may include at least the horizontal physical size of the display unit, and determining the target display parameter based on the display parameters of the first display unit and the second display unit may include determining a minimum horizontal physical size from the horizontal physical sizes of the first display unit and the second display unit, and determining the minimum horizontal physical size as the target display parameter. For example, the vertical physical size of the first display unit and the vertical physical size of the second display unit may be the same, and the horizontal physical size of the first display unit may be larger than the horizontal physical size of the second display unit (e.g., the upper screen and the lower screen of a dual-screen laptop). In this case, the horizontal physical size of the second display unit may be used as the target display parameter. In the long-image browsing scenario, the vertical physical size can determine the allocation of the amount of data of the to-be-displayed data, while the horizontal physical size may determine the size of the displayed data of the first display unit and the second display unit.

402, determining the adjustment parameter for the first data and the second data based on the target display parameter.

In some embodiments, the adjustment parameter may include a scaling index, and determining the adjustment parameter for the first data and the second data based on the target display parameter may include determining the scaling index of the first data and the second data based on the minimum horizontal physical size, and using the scaling index as the adjustment parameter. In this way, when the first display unit and the second display unit display the same image, the display sizes of the two display units can be kept the same, such that when the first display unit and the second display unit display the associated content, the displayed content can be aligned.

403, adjusting the first data and the second data based on the adjustment parameter to obtain the target first data and the target second data respectively.

Consistent with the present disclosure, first, a target display parameter can be determined based on the display parameters of the first display unit and the second display unit. Then, the adjustment parameter for the first data and the second data can be determined based on the target display parameter. Subsequently, the first data and the second data can be adjusted based on the adjustment parameter to obtain the target first data and the target second data respectively. In this way, the target first data being displayed on the first display unit and the target second data being displayed on the second display unit can be aligned.

Figure 5:
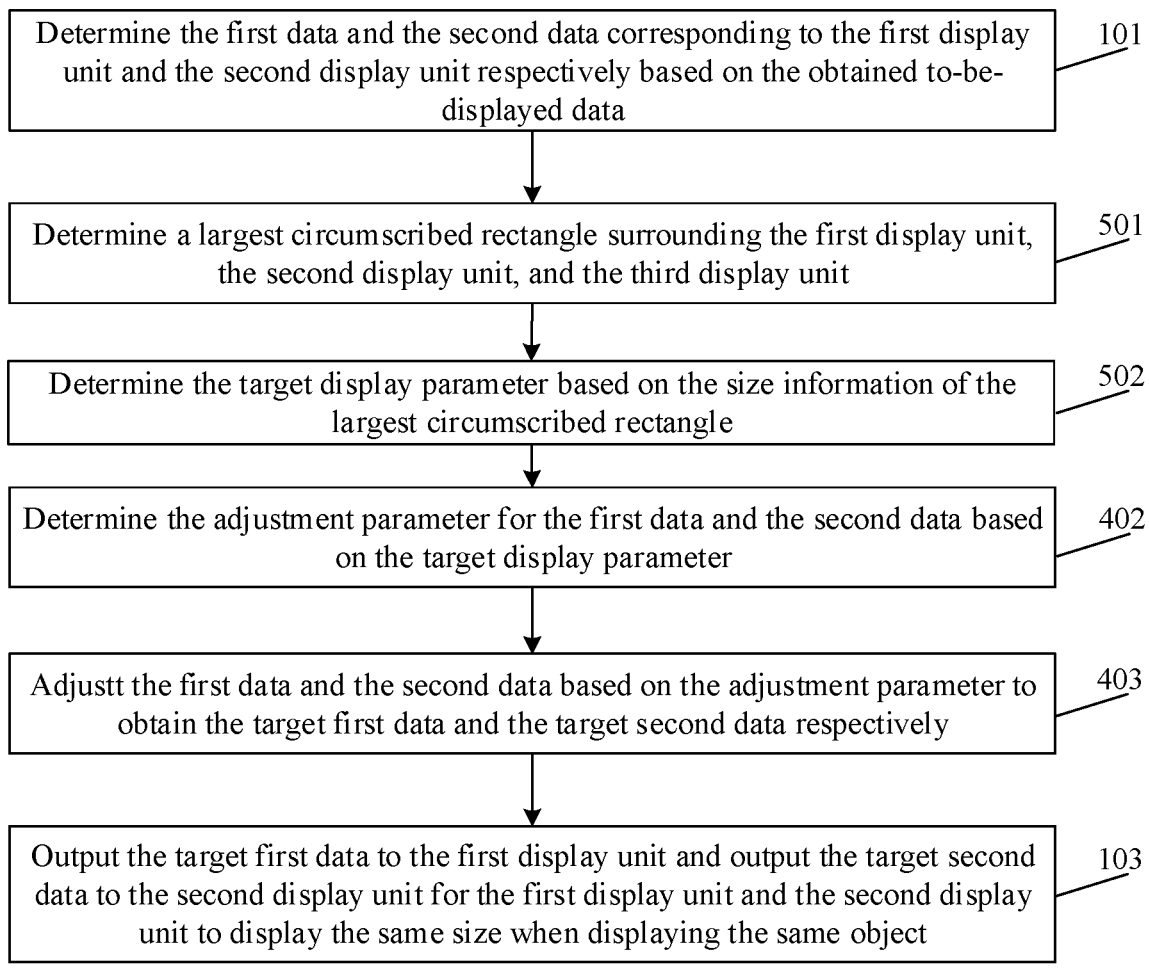
FIG. 5 is a flowchart of the data processing method according to an embodiment of the present disclosure.

In some embodiments, there may be a third display unit, and the third display unit may belong to a third electronic device. At this time, the foregoing method is still applicable, but the determination of the target display parameter may be different. FIG. 5 is a flowchart of the data processing method according to an embodiment of the present disclosure. As shown in FIG. 5, the method for determining the target display parameter may include the following processes.

501, determining a largest circumscribed rectangle surrounding the first display unit, the second display unit, and the third display unit.

In some embodiments, the third display unit may belong to the third electronic device.

In some embodiments, a fourth display unit, a fifth display unit, etc. may also be included. The additional display units may belong to the same electronic device or may belong to several electronic devices, which is not limited in the embodiments of the present disclosure.

In some embodiments, determining the largest circumscribed rectangle surrounding the first display unit, the second display unit, and the third display unit may be to display the associated display content on the first display unit, the second display unit, and the third display unit. For example, the horizontal physical size of the first display unit may be the sum of the horizontal physical sizes of the first display unit and the third display unit, and the vertical physical size of the first display unit may be the same as the vertical physical size of the second display unit and the third display unit. In this case, the first display unit, the second display unit, and the third display unit may be assembled into a display screen whose display area is twice of the display size of the first display unit.

502, determining the target display parameter based on the size information of the largest circumscribed rectangle.

In some embodiments, determining the target display parameter based on the size information of the largest circumscribed rectangle may be to display the associated display content in three display units, but its display effect may be consistent with the display effect of one display unit. For example, the horizontal physical size of the first display unit may be the sum of the horizontal physical sizes of the first display unit and the third display unit, and the vertical physical size of the first display unit may be the same as the vertical physical size of the second display unit and the third display unit. In this case, the first display unit, the second display unit, and the third display unit may be assembled into a display screen whose display area is twice of the display size of the first display unit. Then, if the first display unit is on the upper side, the first display unit and the third display unit are on the lower side, and the second display unit is on the left side of the third display unit, the first display unit may display the display content before the to-be-displayed data, and the second display unit and the third display unit may jointly display the display content after the to-be-displayed data. In addition, the second display unit may display the left half of the display content after the to-be-displayed data, and the third display unit may display the right half of the display content after the to-be-displayed data.

Consistent with the present disclosure, first, a largest circumscribed rectangle surrounding the first display unit, the second display unit, and the third display unit can be determined, where the third display unit may belong to the third electronic device. Subsequently, the target display parameter can be determined based on the size information of the largest circumscribed rectangle. In this way, when there are a plurality of display units, the display area can be increased, and the display effect of one display unit can be achieved at the same time, thereby improving the user experience.

An example application of the embodiments of the present disclosure in a practical implementation scenario will be described below, and the following description takes a dual-screen laptop as an example.

Figure 6:
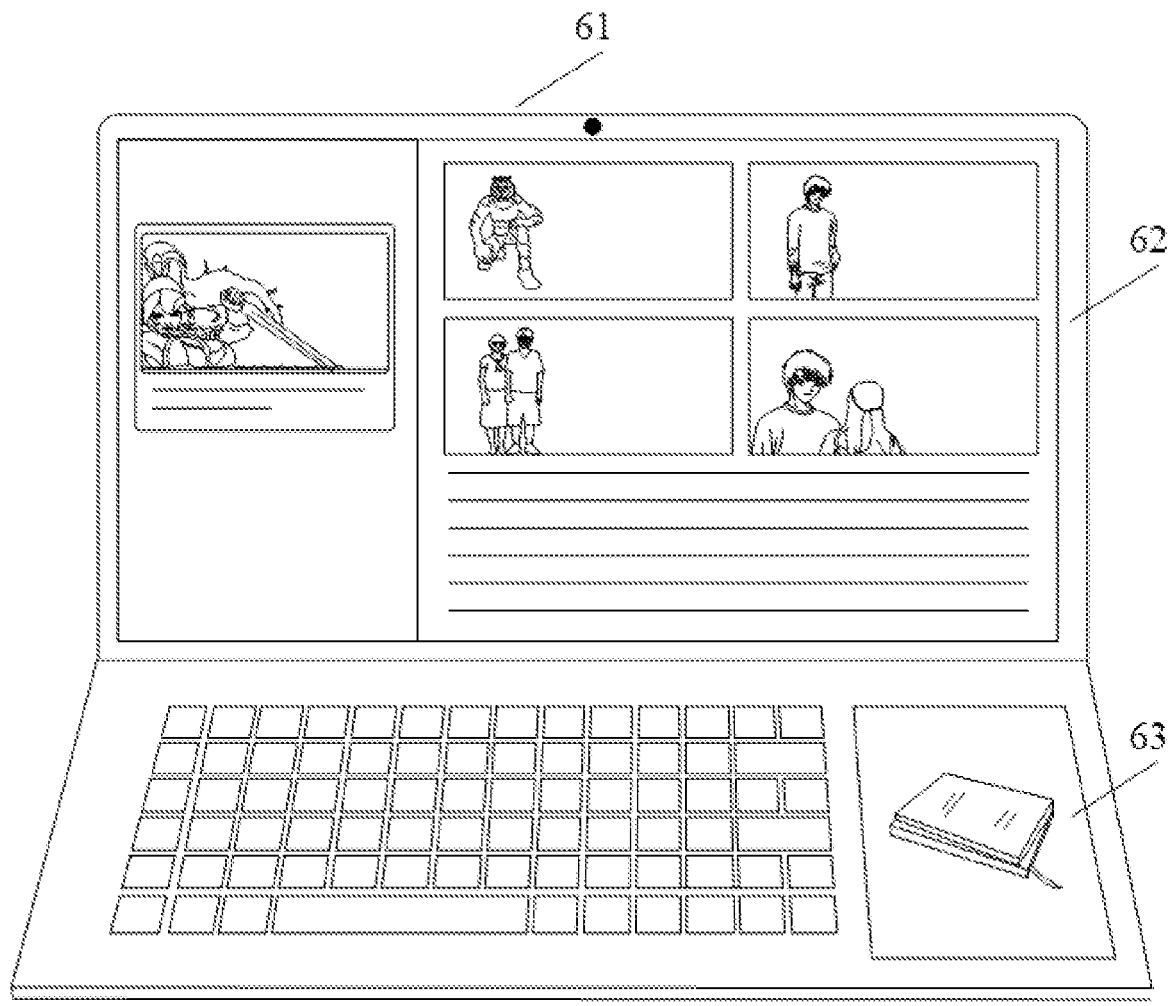
FIG. 6 is a schematic structural diagram of an electronic device according to an embodiment of the present disclosure.

FIG. 6 is a schematic structural diagram of an electronic device according to an embodiment of the present disclosure. As shown in FIG. 6, a dual-screen laptop 61 includes an upper screen 62 and a lower screen 63. In the dual-screen laptop 61, for the browser on the interface, the shopping web page, and the long-image browsing scene of a news article, there is a need to realize the multi-screen interactive experience of the screens of different sizes and different resolutions. Therefore, an embodiment of the present disclosure provides a data processing method, which uses a window management technology to detect DPI and PPI for different screen resolutions. Further, based on the relative position of the screen, the resolution setting and the actual size can be adjusted and adapted to achieve the final effect of multi-screen interactive experience.

Figure 7:
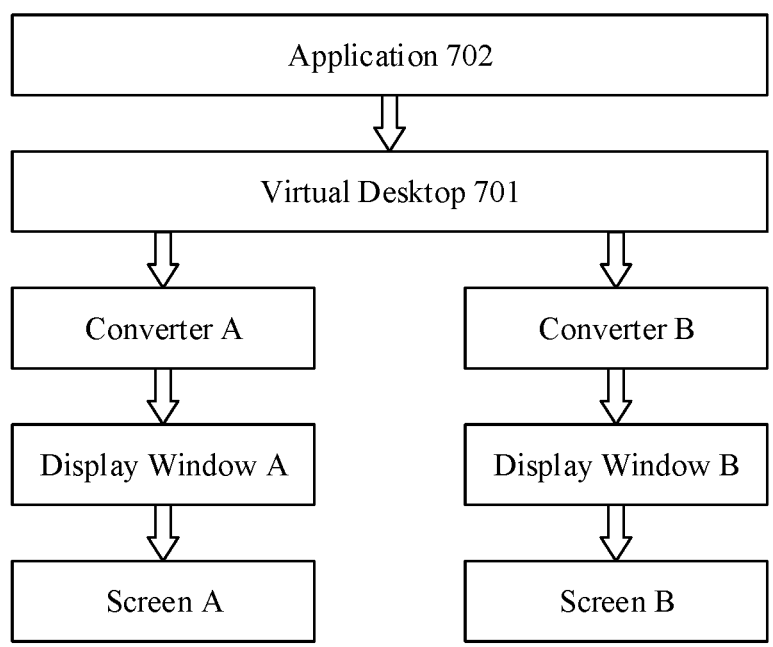
FIG. 7 is a schematic diagram of an implementation of the data processing method according to an embodiment of the present disclosure.

In some embodiments, the data processing method may be implemented by using the processes shown in FIG. 7, which is a schematic diagram of an implementation of the data processing method according to an embodiment of the present disclosure. As shown in FIG. 7, the data processing method may include the following processes.

First, on two different physical monitors, a display window A and a display window B working on the operating system may be displayed respectively.

Next, a window of an application 702 working in a cross-screen interactive mode may be created on a virtual desktop 701 such that the application 702 can submit rendering data.

Here, the virtual desktop may be a virtual display screen that works on top of the operating system. The DPI of the virtual desktop may be set to the maximum DPI of the screen to which window A belongs or the screen to which window B belongs. In some embodiments, the resolution may be obtained from the system, and the model of the device may be obtained from a bottom layer of the system to correspond to actual physical specifications, such as PPI or external dimensions. Different mobile devices may have different screen sizes and standards, some may be measured in millimeters. When an image is displayed on devices of different sizes, the pixel size of the image is fixed. Therefore, by obtaining the DPI of a target device and converting the size of the output image based on the DPI of the target device, the display effect of the display screen can be improved.

Next, the virtual desktop 701 may split the rendering data submitted by the application 702 into two pieces.

Next, a converter may calculate an image scaling index based on the screen PPI in its own rendering path and combined with the split data size obtained from the virtual desktop layer. That is, a converter A may be used to calculate the image scaling index based on the screen PPI in its own rendering path and combined with the size of the split data obtained from the virtual desktop 701 to display the scaled image on the display window A in the display screen A. Similarly, a converter B may be used to calculate the image scaling index based on the screen PPI in its own rendering path and combined with the size of the split data obtained from the virtual desktop 701 to display the scaled image on the display window B in the display screen B.

Finally, the image data may be scaled by the image scaling index, and the data may be pushed to the corresponding display window A or display window B.

Figure 8:
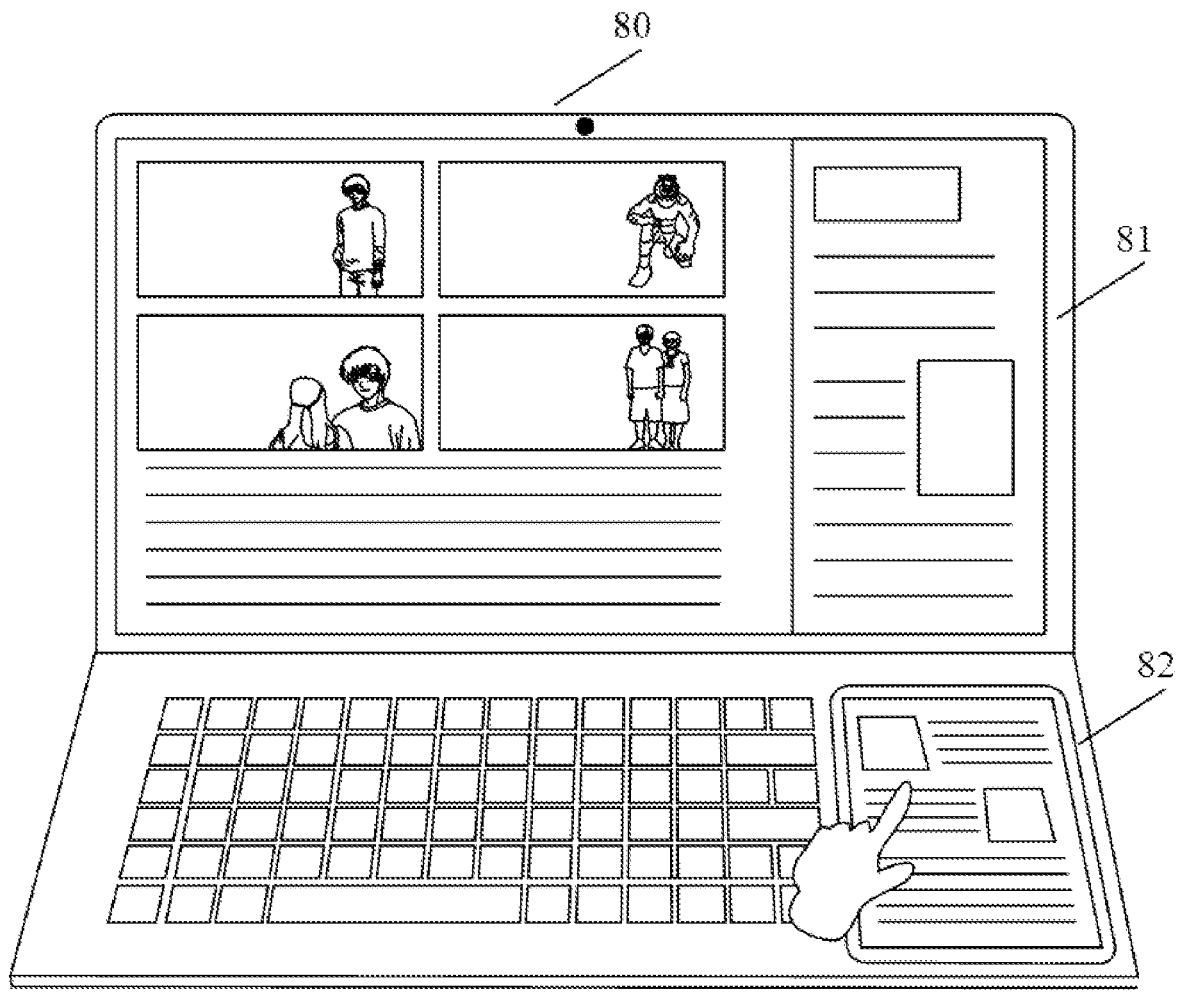
FIG. 8 is a schematic diagram of an application scenario of the data processing method according to an embodiment of the present disclosure.

Here, the data can be pushed to the corresponding display window A or display window B. FIG. 8 is a schematic diagram of an application scenario of the data processing method according to an embodiment of the present disclosure. A shown in FIG. 8, on a dual-screen laptop 80, the split data is displayed on a window 81 and a window 82 of the dual-screen laptop 80 respectively (the window 81 is positioned on the display screen of the upper cover of the dual-screen laptop 80, and the window 82 is positioned on the display screen of the lower cover of the dual-screen laptop 80), and the data displayed on the window 81 and the window 82 have the same size, and the content can be linked and changed. That is, a user may slide the display data on the window 82, and the display data on the window 81 may change accordingly. For example, window 81 and window 82 may display the content of the same application, then window 81 may display the previous display content, and window 82 may display the content after the display content of window 81 (e.g., if the application is a reading application, window 81 and window 82 may display the same article, where window 81 may display the first five paragraphs of the article, and window 82 may display the content after the fifth paragraph of the article following the display content of the window 81. When a slide-up operation or a slide-down operation is performed on the window 81, the display content of the window 82 may also slide up or down. Further, when a slide-up operation or a slide-down operation is performed on the window 82, the display content of the window 81 may also slide up or down. That is, when any window is being operated, the display contents of the window 81 and the window 82 may change in synchronization, and the change of one display window may be the same as the change of the display contents of a display window under the sliding operation, and the sizes of the display contents of the window 81 and the window 82 may be the same. At this time, the user may operate other application programs in the area of the display screen outside the window 81. In this way, the end-user experience can be greatly improved, the value brought by the dual-screen to the user can be greatly enhanced, and the consistent effect of software conversion of screens of different specifications can be achieved.

Figure 9:
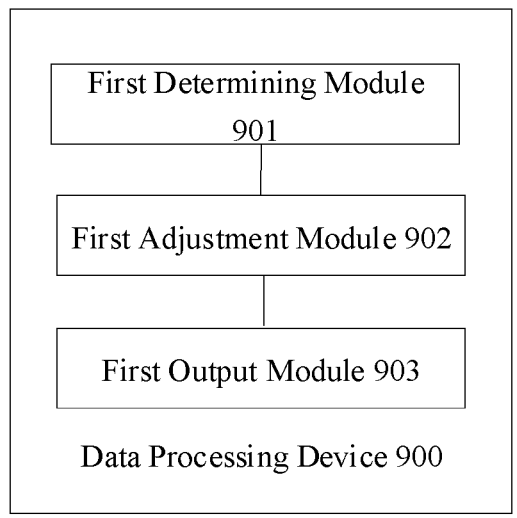
FIG. 9 is a schematic block diagram of a data processing device according to an embodiment of the present disclosure.

An embodiment of the present disclosure provides a data processing device. FIG. 9 is a schematic block diagram of a data processing device according to an embodiment of the present disclosure. As shown in FIG. 9, a data processing device 900 includes a first determining module 901, a first adjustment module 902, and a first output module 903.

The first determining module 901 may be configured to determine the first data and the second data respectively corresponding to the first display unit and the second display unit based on the obtained to-be-displayed data.

The first adjustment module 902 may be configured to adjust the first data and the second data based on the adjustment parameter to obtain the target first data and the target second data respectively. In some embodiments, the adjustment parameter may be determined based on the display parameters of the first display unit and the second display unit, and the display parameters may be related to the pixels per unit area of the first display unit and the second display unit.

The first output module 903 may be configured to output the target first data to the first display unit and output the target second data to the second display unit such that when the first display unit and the second display unit display the same object, the display size is the same.

In some embodiments, the first display unit and the second display unit may both belong to the first electronic device; or, the first display unit may belong to the first electronic device, and the second display unit may belong to the second electronic device.

In some embodiments, when both the first display unit and the second display unit belong to the first electronic device, the first determining module 901 may further includes a first acquisition submodule and a first splitting submodule. The first acquisition submodule may be configured to obtain the to-be-displayed data, and the first splitting submodule may be configured to split the to-be-displayed data based on a preset splitting strategy to obtain the first data and the second data.

In some embodiments, the first electronic device may include an upper cover and a lower cover. The first display unit may be a display screen of the upper cover, and the second display unit may be a display screen of the lower cover. The first adjustment module 902 may be further configured to adjust the first data and the second data based on the adjustment parameter corresponding to the preset splitting strategy to obtain the target first data and the target second data respectively. In some embodiments, the target first data and the target second data may be displayed on the display screen of the upper cover and the display screen of the lower cover, such that the target first data and the target second data can be linked and changed.

In some embodiments, the first determining module 901 may include a first determining submodule, a second determining submodule, and a second splitting submodule.

The first determining submodule may be configured to determine the relative position between the first display unit and the second display unit, and the display parameters of the first display unit and the second display unit.

The second determining submodule may be configured to determine the data size information corresponding to the first display unit and the second display unit based on the relative positions and the display parameters of the first display unit and the second display unit, and the to-be-displayed data.

The second splitting submodule may be configured to split the to-be-displayed data based on the data size information to obtain the first data and the second data.

In some embodiments, the first adjustment module 902 may include a third determining submodule, a fourth determining submodule, and a.

The third determining submodule may be configured to determine a target display parameter based on the display parameters of the first display unit and the second display unit.

The fourth determining submodule may be configured to determine the adjustment parameter for the first data and the second data based on the target display parameter.

The first adjustment submodule may be configured to adjust the first data and the second data based on the adjustment parameter to obtain the target first data and the target second data respectively.

In some embodiments, the display parameter may include the horizontal physical size of the display unit, and the adjustment parameter may include a scaling index. The third determining submodule may include a first determining unit and a second determining unit.

The first determining unit may be configured to determine the minimum horizontal physical size from the horizontal physical sizes of the first display unit and the second display unit.

The second determining unit may be configured to use the minimum horizontal physical size as the target display parameter.

Correspondingly, the fourth determining submodule may include a third determining unit, and a fourth determining unit.

The third determining unit may be configured to determine the scaling index of the first data and the second data based on the minimum horizontal physical size.

The fourth determining unit may be configured to use the scaling index as the adjustment parameter.

In some embodiments, the data processing device may further include a second determining module and a third determining module.

The second determining module may be configured to determine the largest circumscribed rectangle that circumscribes the first display unit, the second display unit, and the second display unit. In some embodiments, the third display unit may belong to a third electronic device.

The third determining module may be configured to determine the target display parameter based on the size information of the largest circumscribed rectangle.

It should be noted that the description of the above device embodiments is similar to the description of the above method embodiments, which can achieve similar beneficial effects of the method embodiments, therefore repetitive description is omitted herein. With respect to the technical details not disclosed in the device embodiments of the present disclosure, please refer to the description of the method embodiments of the present disclosure for a better understanding. For brevity, these are not repeated herein.

Figure 10:
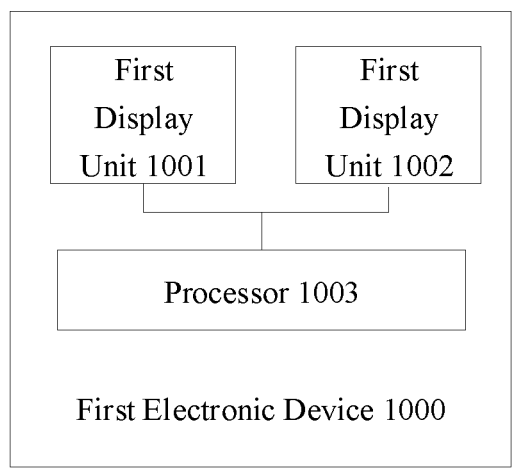
FIG. 10 is a schematic structural diagram of an electronic device according to an embodiment of the present disclosure.

An embodiment of the present disclosure provides a first electronic device. FIG. 10 is a schematic structural diagram of an electronic device according to an embodiment of the present disclosure. As shown in FIG. 10, a first electronic device 1000 includes a first display unit 1001, a second display unit 1002, and a processor 1003.

The first display unit 1001 may be configured to display the target first data.

The second display unit 1002 may be configured to display the target second data.

The processor may be configured to determine the first data and the second data corresponding to the first display unit and the second display unit respectively based on the obtained to-be-displayed data; adjust the first data and the second data to obtain the target first data and the target second data respectively based on the adjustment parameter, where the adjustment parameter may be determined based on the display parameters of the first display unit and the second display unit, and the display parameters may be related to the pixels per unit area of the first display unit and the second display unit; and output the target first data to the first display unit and output the target second data to the second display unit such that when the first display unit and the second display unit display the same object, the display size is the same.

An embodiment of the present disclosure further provides a computer program product having computer-readable codes. When the computer-readable codes are executed in an electronic device, a processor in the electronic device can execute the data processing method described in the foregoing embodiments.

An embodiment of the present disclosure provides a computer-readable storage medium having compute instructions stored thereon. When executed by the processor, the program instructions can cause the processor to implement the data processing method described in the foregoing embodiments.

It should be noted that the computer-readable storage medium/memory includes at least one of a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic storage medium, an optical disk, or a compact disk read-only memory (CD-ROM). The computer-readable storage medium may also be various terminals including one or any combination of the above memories, such as mobile phones, computers, tablet devices, and personal digital assistants, etc.

It should be noted that, in the embodiments of the present disclosure, the terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

The sequence numbers of the embodiments of the present disclosure are only for describing information, and do not represent merit or demerit of the embodiments.

Through the description of the foregoing embodiments, those skilled in the art can clearly understand that the method in the foregoing embodiments can be implemented in software together with general-purpose hardware or in hardware only. However, in most cases, the former is preferred. Based on such understanding, the essential portion of the technical solution of the present disclosure or the contribution in addition to the existing technology can be embodied in the form of a software product. The computer software product stored in a storage medium (such as ROM/RAM, magnetic disk, CD-ROM) includes a plurality of program instructions causing a terminal device (such as a mobile phone, a computer, a server, an air conditioner, and a network device) to perform the processes of the information processing method provided by the embodiments of the present disclosure.

The present disclosure is described with reference to flowcharts and/or block diagrams of a method, a device (system), and a computer program product according to the embodiments of the present disclosure. Each flow and/or block of the flowcharts and/or block diagrams, and a combination of the flow and/or block of the flowcharts and/or block diagrams may be implemented by computer program instructions. The computer program instructions may be provided to a processor of a general-purpose computer, special-purpose computer, embedded processor, or other programmable data processing device to produce a machine, so that the device can be produced for implementing the functions determined by one or more flows of the flowcharts and/or one or more blocks of the block diagrams through the instructions executed by the processors of the computer or other programmable data processing equipment.

The computer program instructions may also be stored in computer-readable memory, which can direct the computer or other programmable data processing equipment to work in a particular manner, so that the instructions stored in the computer-readable memory produce a manufacturing product including an instruction device. The instructions implement the functions determined by one or more flows of the flowcharts and/or one or more blocks of the block diagram.

The computer instructions may also be loaded on the computer or other programmable data processing equipment, so that a series of operation processes are executed on the computer or other programmable data processing equipment to produce a computer-implemented process. Therefore, the instructions executed on the computer or other programmable data processing equipment provide the process to implement the functions determined by one or more flows of the flowchart and/or one or more blocks of the block diagrams.

The above are some embodiments of the present disclosure, and are not intended to limit the scope of the present disclosure. Any equivalent structural transformation made by using the description and drawings of the present disclosure or made by directly or indirectly using the present disclosure in other related technical fields are included in the scope of the present disclosure.

What is claimed is:

1. A data processing method applied to a first electronic device, comprising:
   determining first data and second data corresponding to a first display unit and a second display unit respectively based on obtained to-be-displayed data;
   adjusting the first data and the second data to obtain target first data and target second data respectively based on an adjustment parameter, the adjustment parameter being determined based on display parameters of the first display unit and the second display unit, the display parameters being related to pixels per unit area of the first display unit and the second display unit; and
   outputting the target first data to the first display unit and outputting the target second data to the second display unit for the first display unit and the second display unit to display a same size when displaying a same object;
   wherein:
   the first electronic device includes an upper cover and a lower cover, the first display unit is a display screen on the upper cover, the second display unit is a display screen on the lower cover, and a horizontal physical size of the second display unit is different from a horizontal physical size of the first display unit;
   the display parameters include the horizontal physical sizes of the first display unit and the second display unit;
   the adjustment parameter includes a scaling index; and
   adjusting the first data and the second data to obtain the target first data and the target second data respectively based on the adjustment parameter includes:
   determining a minimum horizontal physical size from the horizontal physical sizes of the first display unit and the second display unit;
   determining the scaling index of the first data and the second data based on the minimum horizontal physical size; and
   using the scaling index as the adjustment parameter.

2. The method of claim 1, wherein determining the first data and the second data corresponding to the first display unit and the second display unit respectively based on the obtained to-be-displayed data includes:
obtaining the to-be-displayed data; and
splitting the to-be-displayed data based on a preset splitting strategy to obtain the first data and the second data.

3. The method of claim 2, wherein:
adjusting the first data and the second data to obtain the target first data and the target second data respectively based on the adjustment parameter includes:
adjusting the first data and the second data based on the adjustment parameter corresponding to the preset splitting strategy to obtain the target first data and the target second data respectively, the target first data and the target second data being displayed on the display screen of the upper cover and the display screen of the lower cover for the target first data and the target second data to change correspondingly.

4. The method of claim 1, wherein determining the first data and the second data corresponding to the first display unit and the second display unit respectively based on the obtained to-be-displayed data includes:
determining a relative position between the first display unit and the second display unit, and the display parameters of the first display unit and the second display unit;
determining data size information corresponding to the first display unit and the second display unit based on the relative position and the display parameters of the first display unit and the second display unit, and the to-be-displayed data; and
splitting the to-be-displayed data based on the data size information to obtain the first data and the second data.

5. The method of claim 1, wherein adjusting the first data and the second data to obtain the target first data and the target second data respectively based on the adjustment parameter further includes:
determining a target display parameter based on the display parameters of the first display unit and the second display unit;
determining the adjustment parameter for the first data and the second data based on the target display parameter; and
adjusting the first data and the second data based on the adjustment parameter to obtain the target first data and the target second data respectively.

6. The method of claim 5, further comprising:
determining a largest circumscribed rectangle circumscribing the first display unit, the second display unit, and a third display unit, the third display unit belonging to a second electronic device; and
determining the target display parameter based on size information of the largest circumscribed rectangle.

7. The method of claim 1, wherein the lower cover of the first electronic device includes a keyboard at a side of the second display unit.

8. A first electronic device comprising:
a first display unit configured to display target first data;
a second display unit configured to display target second data; and
a processor configured to:
determine first data and second data corresponding to the first display unit and the second display unit respectively based on obtained to-be-displayed data;
adjust the first data and the second data based on an adjustment parameter to obtain the target first data and the target second data respectively, the adjustment parameter being determined based on display parameters of the first display unit and the second display unit, the display parameters being related to pixels per unit area of the first display unit and the second display unit; and
output the target first data to the first display unit and output the target second data to the second display unit for the first display unit and the second display unit to display a same size when displaying a same object;
wherein:
the first electronic device includes an upper cover and a lower cover, the first display unit is a display screen on the upper cover, the second display unit is a display screen on the lower cover, and a horizontal physical size of the second display unit is different from a horizontal physical size of the first display unit;
the display parameters include the horizontal physical sizes of the first display unit and the second display unit;
the adjustment parameter includes a scaling index; and
the processor is further configured to:
determine a minimum horizontal physical size from the horizontal physical sizes of the first display unit and the second display unit;
determine the scaling index of the first data and the second data based on the minimum horizontal physical size; and
use the scaling index as the adjustment parameter.

9. The first electronic device of claim 8, wherein the processor is further configured to:
obtain the to-be-displayed data; and
split the to-be-displayed data based on a preset splitting strategy to obtain the first data and the second data.

10. The first electronic device of claim 9, wherein the processor is further configured to:
adjust the first data and the second data based on the adjustment parameter corresponding to the preset splitting strategy to obtain the target first data and the target second data respectively, the target first data and the target second data being displayed on the display screen of the upper cover and the display screen of the lower cover for the target first data and the target second data to change correspondingly.

11. The first electronic device of claim 8, wherein the processor is further configured to:
determine a relative position between the first display unit and the second display unit, and the display parameters of the first display unit and the second display unit;
determine data size information corresponding to the first display unit and the second display unit based on the relative position and the display parameters of the first display unit and the second display unit, and the to-be-displayed data; and
split the to-be-displayed data based on the data size information to obtain the first data and the second data.

12. The first electronic device of claim 8, wherein the processor is further configured to:
determine a target display parameter based on the display parameters of the first display unit and the second display unit;
determine the adjustment parameter for the first data and the second data based on the target display parameter; and adjust the first data and the second data based on the adjustment parameter to obtain the target first data and the target second data respectively.

13. A non-transitory computer-readable storage medium containing computer-executable instructions for, when executed by one or more processors, performing a data processing method applied to a first electronic device, the method comprising:

determining first data and second data corresponding to a first display unit and a second display unit respectively based on obtained to-be-displayed data;

adjusting the first data and the second data to obtain target first data and target second data respectively based on an adjustment parameter, the adjustment parameter being determined based on display parameters of the first display unit and the second display unit, the display parameters being related to pixels per unit area of the first display unit and the second display unit; and outputting the target first data to the first display unit and outputting the target second data to the second display unit for the first display unit and the second display unit to display a same size when displaying a same object;

wherein:

the first electronic device includes an upper cover and a lower cover, the first display unit is a display screen on the upper cover, the second display unit is a display screen on the lower cover, and a horizontal physical size of the second display unit is different from a horizontal physical size of the first display unit;

the display parameters include the horizontal physical sizes of the first display unit and the second display unit;

the adjustment parameter includes a scaling index; and adjusting the first data and the second data to obtain the target first data and the target second data respectively based on the adjustment parameter includes:

determining a minimum horizontal physical size from the horizontal physical sizes of the first display unit and the second display unit;

determining the scaling index of the first data and the second data based on the minimum horizontal physical size; and using the scaling index as the adjustment parameter.

14. The non-transitory computer-readable storage medium of claim 13, wherein determining the first data and the second data corresponding to the first display unit and the second display unit respectively based on the obtained to-be-displayed data includes:

obtaining the to-be-displayed data; and splitting the to-be-displayed data based on a preset splitting strategy to obtain the first data and the second data.

15. The non-transitory computer-readable storage medium of claim 14, wherein:

adjusting the first data and the second data to obtain the target first data and the target second data respectively based on the adjustment parameter includes:

adjusting the first data and the second data based on the adjustment parameter corresponding to the preset splitting strategy to obtain the target first data and the target second data respectively, the target first data and the target second data being displayed on the display screen of the upper cover and the display screen of the lower cover for the target first data and the target second data to change correspondingly.

16. The non-transitory computer-readable storage medium of claim 13, wherein determining the first data and the second data corresponding to the first display unit and the second display unit respectively based on the obtained to-be-displayed data includes:

determining a relative position between the first display unit and the second display unit, and the display parameters of the first display unit and the second display unit;

determining data size information corresponding to the first display unit and the second display unit based on the relative position and the display parameters of the first display unit and the second display unit, and the to-be-displayed data; and splitting the to-be-displayed data based on the data size information to obtain the first data and the second data.

17. The non-transitory computer-readable storage medium of claim 13, wherein adjusting the first data and the second data to obtain the target first data and the target second data respectively based on the adjustment parameter further includes:

determining a target display parameter based on the display parameters of the first display unit and the second display unit;

determining the adjustment parameter for the first data and the second data based on the target display parameter; and adjusting the first data and the second data based on the adjustment parameter to obtain the target first data and the target second data respectively.

* * * * *